United States Patent [19]
Takahashi et al.

[11] Patent Number: 5,491,396
[45] Date of Patent: Feb. 13, 1996

[54] MAGNETIC BEARING APPARATUS AND ROTATING MACHINE HAVING SUCH AN APPARATUS

[75] Inventors: Naohiko Takahashi, Ibaraki; Minoru Hiroshima, Ushiku; Osami Matsushita, Ibaraki; Yasuo Fukushima, Tsuchiura, all of Japan

[73] Assignee: Hitachi, Ltd., Tokyo, Japan

[21] Appl. No.: 243,904

[22] Filed: May 17, 1994

[30] Foreign Application Priority Data

May 18, 1993 [JP] Japan .................................. 5-115595

[51] Int. Cl.$^6$ ................................................ G05D 13/00
[52] U.S. Cl. ........................ 318/632; 318/623; 310/90.5; 324/207.12
[58] Field of Search .................... 310/156, 254, 310/179, 90.5; 318/460, 605, 629, 661, 568.21, 687, 640, 567, 618, 632, 648, 611, 623; 324/207.12, 207.11

[56] References Cited

U.S. PATENT DOCUMENTS

| | | | |
|---|---|---|---|
| 4,090,745 | 5/1978 | Dohogne et al. | |
| 4,626,754 | 12/1986 | Habermann et al. | 318/605 |
| 4,686,404 | 8/1987 | Nakazeki et al. | 310/90.5 |
| 4,697,128 | 9/1987 | Matsushita et al. | 318/607 |
| 4,891,212 | 9/1989 | Matsushita et al. | 318/607 |
| 4,961,352 | 10/1990 | Downer | 310/90.5 |
| 5,023,533 | 6/1991 | Ishikawa et al. | 318/687 |
| 5,036,265 | 7/1991 | Werhrich et al. | 318/618 |
| 5,079,467 | 1/1992 | Dorman | 310/156 |
| 5,256,952 | 10/1993 | Yoneyama et al. | 318/629 |

FOREIGN PATENT DOCUMENTS

| | | |
|---|---|---|
| 0560234 | 9/1993 | European Pat. Off. |
| 2919236 | 11/1980 | Germany |
| 4-8911 | 1/1992 | Japan |
| 88/03459 | 5/1988 | WIPO |
| 92/08150 | 5/1992 | WIPO |

OTHER PUBLICATIONS

Hannes Bleuler; "Decentralized Control of Magnetic Rotor Bearing Systems", Swiss Fed. Inst of Tech (Dissertation), 1984.

*Primary Examiner*—John W. Cabeca
*Attorney, Agent, or Firm*—Antonelli, Terry, Stout & Kraus

[57] ABSTRACT

A magnetic bearing is provided with a simulating circuit for estimating a displacement of a rotor on the basis of a force which is exerted on the rotor. An output of the simulating circuit is compared with an actual displacement signal. A delay circuit and a subtracter are provided to subtract a run-out, which was estimated one period before the rotation of the rotor, from the displacement signal. A displacement signal from which the run-out component was eliminated is set to a new displacement signal. A signal which is obtained by adding an estimated run-out of one period before, namely, an output of the delay circuit to the run-out which was estimated by comparing the output of the simulating circuit with the new displacement signal is newly inputted to the delay circuit. Due to this, the run-out component is eliminated from the displacement signal of the magnetic bearing, the load on power amplifiers for driving the electromagnets is reduced, there is a surplus for a saturation which is caused in a high frequency band, the reliability of the control system is improved, and deterioration of positional accuracy due to the run-out is prevented.

9 Claims, 5 Drawing Sheets

F I G. 3A
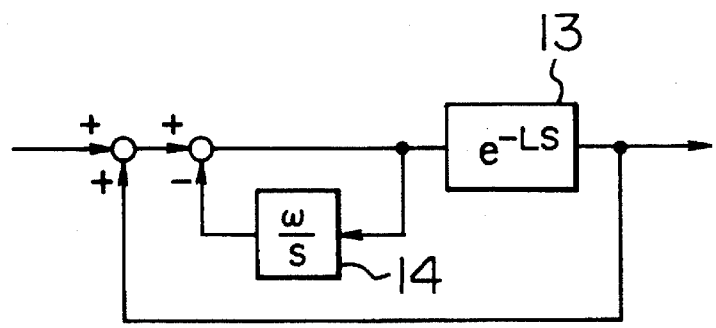
F I G. 3B
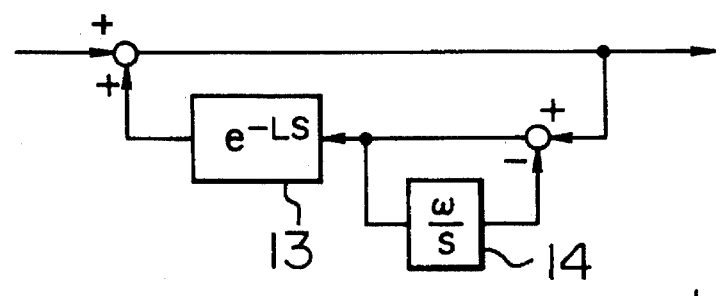
$$L = \frac{2\pi}{k \cdot \Omega}$$
$$k = 1, 2, \cdots$$

F I G. 4A
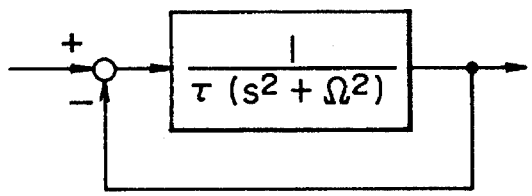
F I G. 4B
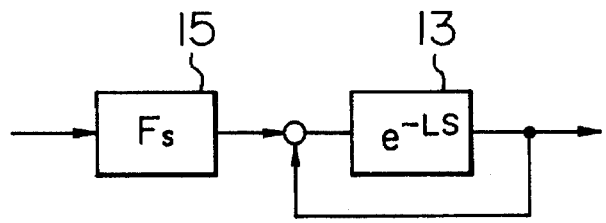
F I G. 4C
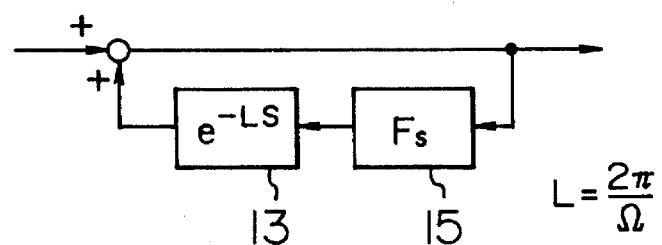
F I G. 5
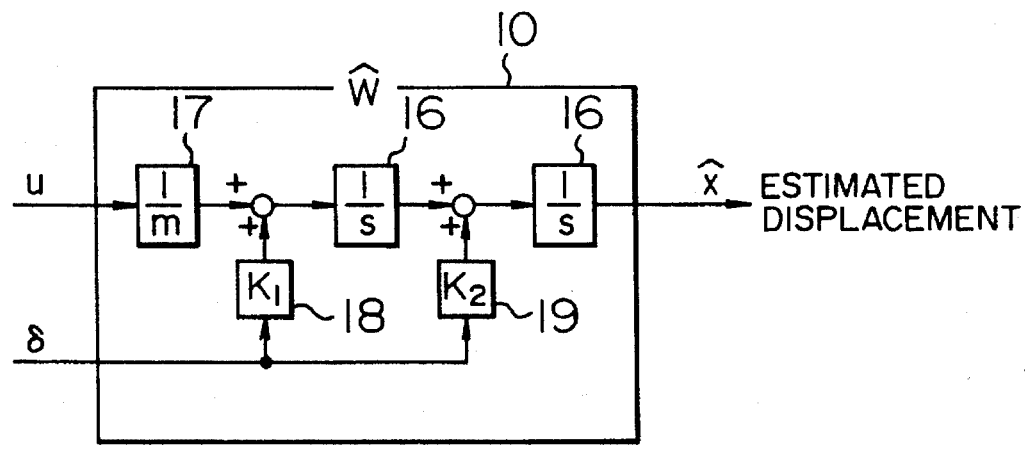

MAGNETIC BEARING APPARATUS AND ROTATING MACHINE HAVING SUCH AN APPARATUS

BACKGROUND OF THE INVENTION

The present invention relates to a control apparatus for a magnetic bearing for rotatably supporting a rotor by using a magnetic floating type rotor, and to a rotating machine using such a control apparatus.

A magnetic bearing according to the invention is an active magnetic bearing for supporting a rotor in a space by an attracting force of electromagnets which face each other through the rotor. To stably support the rotor, the position of the rotor is always monitored by a displacement sensor, and an electromagnetic force of an active type magnetic bearing is controlled on the basis of an output signal of the displacement sensor. A compensating circuit which is used in the control of the magnetic bearing is generally fundamentally based on a PID control.

FIG. 7 shows a concept of a radial bearing as one of the magnetic bearings. Reference numeral 1 denotes a rotor; 2 a displacement sensor; 3a and 3b electromagnets; 4 a converter of the displacement sensor; 5 a compensating circuit; 6 a positive/negative switcher; 7a and 7b power amplifiers (current amplifiers); and 8 an auxiliary bearing. The control of such a magnetic bearing has been disclosed in "Dynamics of Apparatuses Using Electromagnetic Force", Corona Co., Ltd., published on 25 Jul., 1990, pages 159–176, and Hannes Bleuler, "Decentralized Control of Magnetic Rotor Bearing Systems", (thesis for a degree of a Switzerland College of an Institute of Technology), Juris Druck+Verlag Zürich, 1984. An apparatus for providing a countermeasure to an overload at the time of a high speed rotation in case of using the magnetic bearing is disclosed in JP-A-4-8911.

In the above conventional magnetic bearing, in order to assure a rigidity or damping property of the bearing, it is necessary to set the gain of a compensating circuit to a large value. Such a point is particularly remarkable in a high frequency region. In this case, noises cannot help being amplified. On the other hand, since a load of a power amplifier is an electromagnet, namely, inductance, a current control ability is limited in the high frequency region in which the impedance increases. When a current command over the ability is given to the power amplifier, since the ability of the power amplifier is saturated, phase characteristics are deteriorated and it is difficult to control the magnetic bearing as a whole system, and instability is enhanced. To avoid such a situation, therefore, it is necessary to prevent a current command in a high frequency range, such as noises or the like, from being inputted to the power amplifier.

As one of the causes of the high frequency noises, there is a run-out which is captured by a displacement sensor. As a narrow meaning, "run-out" means noises which are generated in a signal of the displacement sensor due to a distortion of the surface shape of the rotor. As a broad meaning, "run-out" means noises which also include a whirling signal which is caused in the signal of the displacement sensor due to a deforming shape of the rotor. In the specification, the former one is called a "run-out". The noises due to the run-out include the noises which are synchronized with the rotational speed and their double harmonics. As the diameter of the machine increases and the machine rotates at a high speed, such a noise problem becomes typical and a countermeasure is required.

An apparatus for attracting a rotary shaft in one direction when an output of the displacement sensor is equal to or larger than a set value has been disclosed in JP-A-4-8911. In such a conventional apparatus, however, there is an inconvenience such that it is necessary to attract the rotary shaft by an auxiliary magnet, and the apparatus increases in size.

SUMMARY OF THE INVENTION

It is an object of the present invention to provide a control circuit for a magnetic bearing to reduce the load in a high frequency range of a power amplifier by eliminating noises which are caused by the run-out without making a construction of a rotating system complicated. To accomplish the above object, a control apparatus for a magnetic bearing of the invention is provided with a simulating circuit for estimating the displacement of a rotor on the basis of a force which is exerted on the rotor by the magnetic bearing, wherein by comparing an output of the simulating circuit and an actual displacement signal, the run-out is estimated. Further, the control apparatus comprises a delay circuit and a subtracter for subtracting the run-out which was estimated one period before the rotor revolution from the original displacement signal, and the displacement signal from which the run-out component was eliminated is set to a new displacement signal. Thus, the displacement signal which is compared with the output of the simulating circuit is newly replaced by the displacement signal from which the run-out component was eliminated. The signal in which the estimated run-out of one period before, namely the output of the delay circuit, was added to the run-out which had been estimated by the comparison between the output of the simulating circuit and the new displacement signal is newly inputted to the delay circuit.

The simulating circuit has been adjusted so as to simulate a transfer function (compliance) of the rotor at a high fidelity. The force which is exerted on the rotor by the magnetic bearing is inputted as information, and an estimated displacement of the rotor is generated. On the other hand, the run-out which is caused due to a decentering of a sensor target or a working roughness is included in the output of the displacement sensor which is actually attached in the machine. However, by subtracting the output of the simulating circuit, the run-out component is extracted.

The estimated run-out is delayed by the delay circuit by a time of only one rotation period and is used to eliminate the run-out from the output of the displacement sensor. A mechanism in such a case will now be described in detail hereinbelow. First, the run-out is estimated as mentioned above at the time of the first rotation. At the time of the subsequent rotation, the estimated run-out at the first rotation time is subtracted from the original output of the displacement sensor, and the result is inputted to a compensating circuit of the magnetic bearing. At the same time, the simulating circuit newly estimates the displacement of the rotor, performs a comparison in a manner similar to the first rotation time, and obtains a new estimated run-out. However, from the signal of the displacement sensor as a reference for comparison, the previous estimated run-out has already been subtracted. Therefore, the previous estimated run-out is added to the newly estimated run-out by an adder, and the result is set to the estimation run-out at the second rotation time.

By repeating the above method each time the rotor rotates, the estimation of run-out is updated, and the displacement signal including no run-out is inputted to the compensating circuit. Thus, the noises which are caused by the run-out can be reduced.

BRIEF DESCRIPTION OF THE DRAWINGS

FIGS. 3A and 3B are diagrams showing examples of a feedback circuit for compensation of the run-out;

FIGS. 4A, 4B, and 4C are diagrams showing examples of a run-out compensating circuit in the case where the elimination of the run-out is limited to a rotational speed component;

FIG. 5 is a diagram showing an example of a simulating circuit;

DESCRIPTION OF THE PREFERRED EMBODIMENTS

Figure 1:
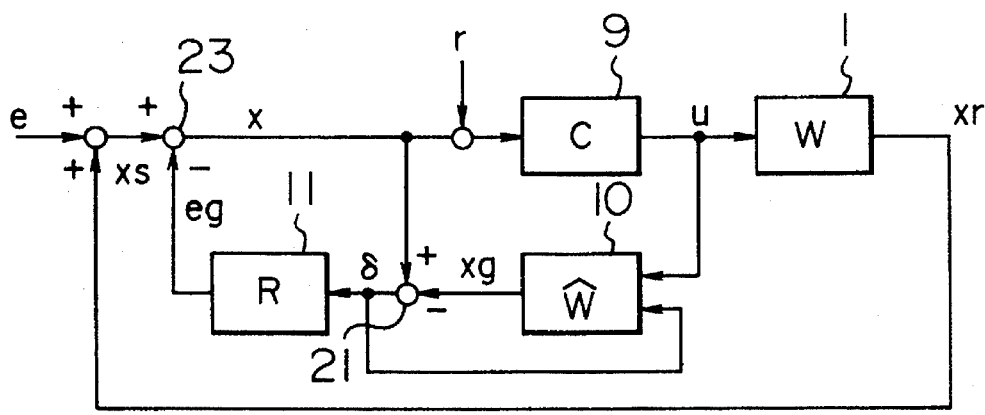
FIG. 1 is a block diagram showing an example of the present invention.
Figure 7:
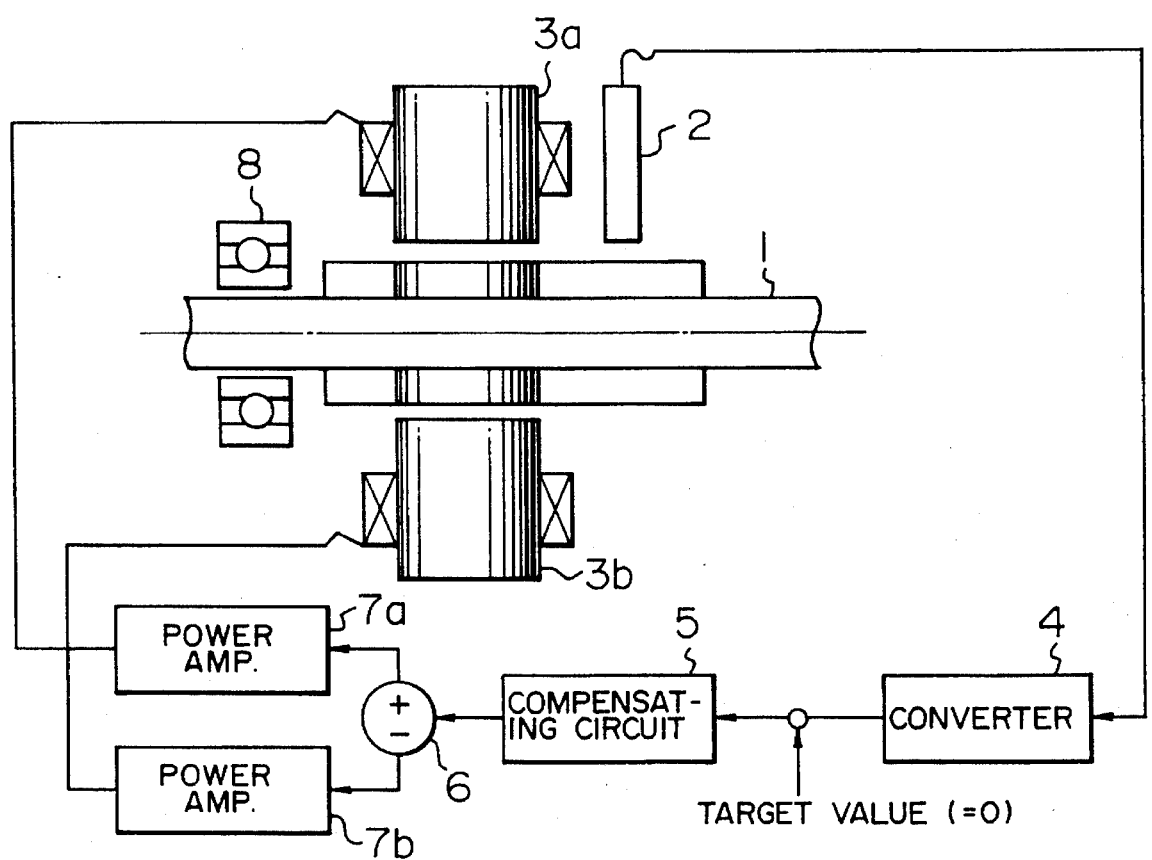
FIG. 7 is a conceptual diagram of a radial bearing control system.

FIG. 1 shows a block diagram of an embodiment of the present invention. In FIG. 1, reference numeral 1 denotes the block showing the rotor and 9 indicates a block showing a magnetic bearing controller including the compensating circuit 5, positive/negative switcher 6, power amplifiers 7a and 7b, and electromagnets 3a and 3b in FIG. 7. Reference numeral 10 denotes a block showing a simulating circuit, and 11 indicates a block showing a feedback circuit for compensation of a run-out.

A force (u) of the magnetic bearing which acts on the rotor corresponds to an input of the block 1 of the rotor. A displacement Xr of the rotor corresponds to an output of the rotor 1. When the blocks 10 and 11 do not exist, a run-out (e) is added to the displacement Xr of the rotor 1 during the operation. The signal is inputted to the magnetic bearing controller 9 in a state in which the run-out component was added to the displacement Xr of the rotor 1. On the basis of the input signal, the magnetic bearing controller 9 controls an output signal so as to position the rotor to a predetermined position (r). Further specifically speaking, the block 9 is a system having the functions of the compensating circuit 5, positive/negative discriminator 6, power amplifiers 7, and electromagnets 3 which have already been described in the conventional technique. The output signal of the block 9 corresponds to a force which is generated by the magnetic bearing. In the conventional control system in which the blocks 10 and 11 don't exist, the magnetic bearing controller 9 controls the rotor in accordance with the displacement signal including the run-out. Therefore, a surplus force which is caused due to a deviation amount that is inherently unnecessary for the control is exerted on the rotor.

A run-out elimination when the blocks 10 and 11 are made operative as a feature of the present invention will now be described. The block 10 corresponds to the simulating circuit for mathematically equivalently simulating the input/output characteristics of the rotor 1 and can be constructed by either an analog circuit and a digital circuit. The simulating circuit 10 is a state estimating device and traces the displacement X of the rotor 1 at a high fidelity by using the output (u) of the magnetic bearing controller 9 as information. The simulating circuit 10 is mathematically equivalently constructed (however, such a mathematical equivalence is limited to a certain frequency band). Therefore, in the rotor of a magnetic bearing system of the complete floating system, the simulating circuit has poles at an origin, and an initial value error increases. Therefore, as shown in FIG. 1, by feeding back the difference between the displacement signal X of the rotor and its estimation signal Xg, the initial errors are converged. An example shown in FIG. 5 relates to a case where it is modeled by using the rotor as one degree of freedom mass point. FIG. 5 shows a construction of the simulating circuit and a feedback control system. A construction of such a circuit is widely applied as an observer theory, and a similar simulating circuit can be constructed even by a system of a multidegree of freedom including a bending vibration of the rotor.

Figure 2A:
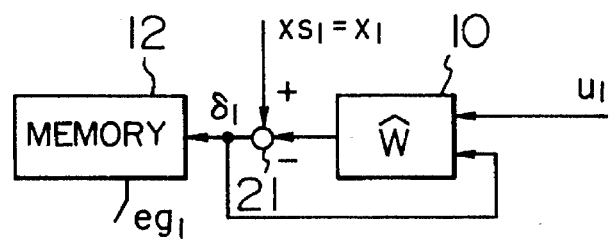
FIGS. 2A to 2C are diagrams showing a progressing state of the estimation and elimination of the run-out.
Figure 2B:
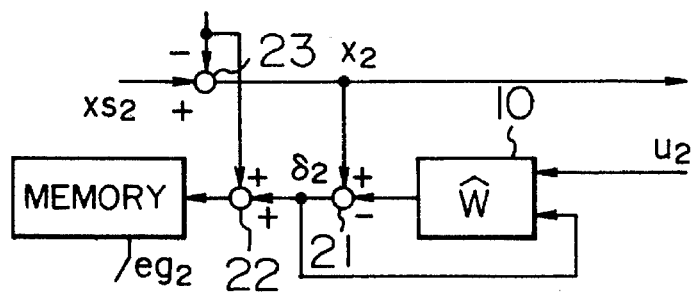
Figure 2C:
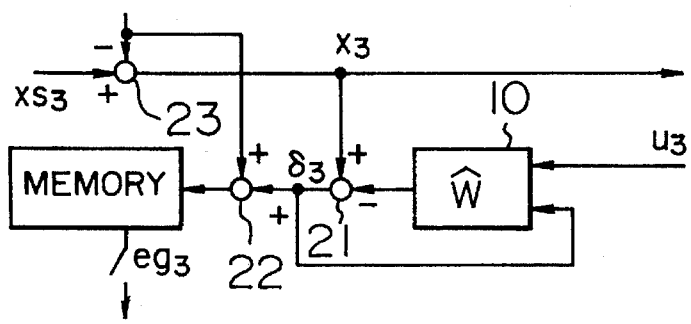
Figure 6A:
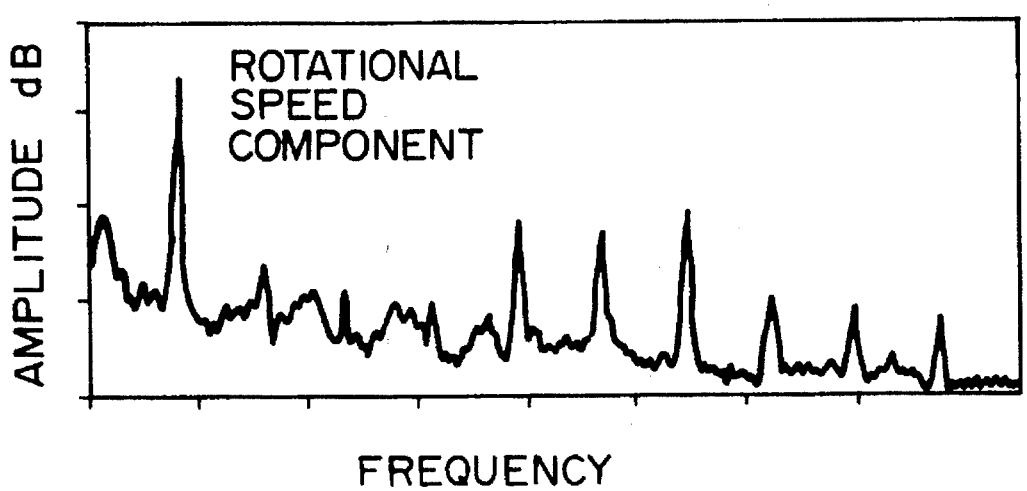
FIGS. 6A and 6B are diagrams showing examples of spectra of sensor signals before and after the run-out is/was eliminated.
Figure 6B:
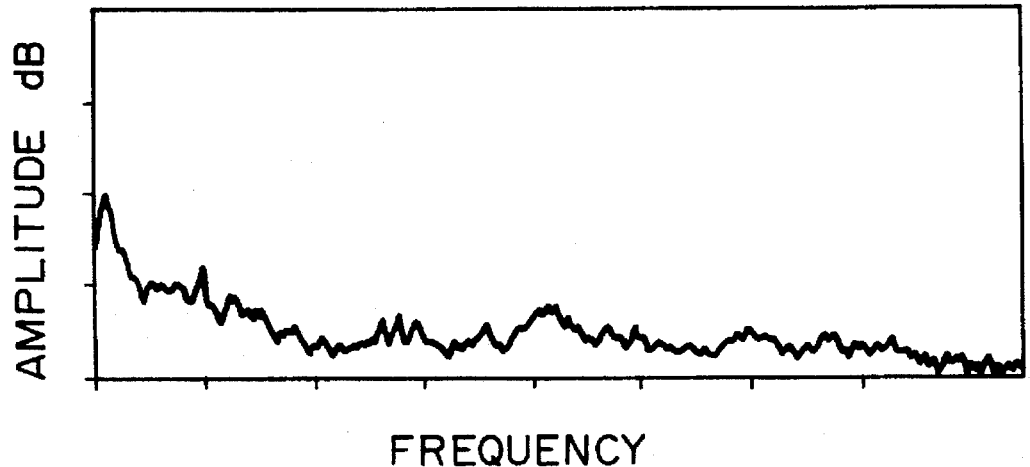

The block 11 relates to a portion to process an estimated run-out, and examples of its processing mechanism are shown in FIGS. 2A, 2B, and 2C. First, the simulating circuit 10 estimates a displacement of the rotor 1 by using the output (u) of the magnetic bearing controller 9 as information. An actual displacement sensor signal Xs1 and an estimated displacement, which was estimated by the simulating circuit, are compared by a subtracter 21, thereby calculating an estimation run-out eg1 (=δ1) at the first time. As for the estimation run-out eg1, by attaching an encoder to the rotor or the like, the value is obtained every rotational angle of the rotor and is stored in the memory. As an estimation run-out eg1 stored in the memory, each amount corresponding to the rotational angle is swept out at the next one rotation of the rotor. By subtracting the stored estimation run-out eg1 from a displacement sensor signal Xs2 by a subtracter 23, a signal X2 from which the run-out was eliminated is obtained. The signal X2 is set as an input signal of the magnetic bearing controller 9, thereby assuring that the controller 9 controls with respect to the run-out component.

While the above process is executed, the second run-out estimation is further performed for the next one rotation. In the estimation of the second time, the previous estimation run-out eg1 is added by an adder 22 to a comparison result δ2 between the output of the simulating circuit 10 and the displacement sensor signal X2 from which the run-out was eliminated, thereby obtaining an estimation run-out eg2 of the second time. The second estimation run-out eg2 is also stored into the memory in a manner similar to the previous estimation run-out and is swept out at the time of the next rotation.

By repeating such processes, only the signal from which the run-out was always eliminated is inputted to the magnetic bearing controller 9 as shown in FIG. 1.

As described above, the block 11 has functions such that while temporarily storing the signal, the signal is swept out with a delay time of one period and the signal of one period before to be stored is added to the signal to be stored. FIGS. 3A and 3B show examples of such a circuit construction. In FIG. 3A, reference numeral 13 denotes a delay circuit to delay an output by only a predetermined time. In this case, a delay time L corresponds to the time of one rotation of the rotor, namely, rotating period. When the input signal is inputted to the delay circuit as it is, even as for a deviation which doesn't change with regard to the time like an offset voltage of an operational amplifier, it is regarded as a run-out and is eliminated, so that a gravity compensation of the magnetic bearing controller 9 is deteriorated. Therefore, in FIG. 3A, by providing a high pass filter (feedback circuit of ω/s) 14 before the input section of the delay circuit 13, only the fluctuation component is eliminated. In the case where the estimating mechanism does not satisfactorily operate in a very high frequency region because of a limitation of the number of dimensions of the simulating circuit 10, it is sufficient to add a low pass filtering function to the high pass filter as necessary.

FIG. 3B shows another example of the feedback circuit 11 for compensation of a run-out. When passing a critical speed, the vibration of the rotor increases due to an unbalance of the rotor system. In this instance, when the above-mentioned run-out eliminating mechanism is operated, even an unbalance vibration is erroneously recognized as a run-out of the displacement sensor, so that there is also considered a case where the vibration of the rotor cannot be suppressed. To avoid such a situation, there is effective means such that the delay time of the delay circuit 13 is set to the time of, for example, a half period in which the rotating period of the rotor is divided by a certain integer, thereby reducing an elimination amount of the run-out of the rotational speed component. As another means, there is also a method whereby in case of passing the critical speed, the run-out estimating mechanism is temporarily stopped, and only the data of the estimation run-out stored in the memory is used for a period of time during which the rotational speed passes the critical speed.

As an application of the latter method, the collection of the run-out estimation data is limited to the magnetic bearing control apparatus of the master and the data of the master is stored and used for each of the magnetic bearing control apparatuses of the mass production and only the subtracting process of the run-out is executed, so that the costs can be reduced although the control slightly deteriorates.

When the user wants to limit a target of the elimination of the run-out to only the rotational speed component, it is desirable to construct the feedback circuit 11 for run-out compensation by combining the delay circuit 13 and tracking filters 15 and 20 as shown in examples of FIGS. 4B and 4C. The tracking filter is a filter mechanism which functions synchronously with the rotational speed of the rotor and extracts only the rotational speed component of the input signal. A transfer function of the tracking filter is, for example, as shown in FIG. 4A and is used in the tracking filter 15 in FIGS. 4B and 4C. Due to this, the rotating frequency component is efficiently eliminated from the spectrum of the displacement signal.

In the above description, nothing is particularly mentioned with respect to the kind of rotating machine. However, for instance, a gas compressor or the like is considered. A gas compressor of the multistage type generally uses a structure such that portions near both end portions of the shaft are supported by two bearings, and impellers of a plurality of stages are attached to the shaft at the position corresponding to the portion between the bearings. In the above structure, a thrust force is balanced by a pressure of the gas which was compressed by the compressor, and a radial load is supported by a radial magnetic bearing. The invention can be applied to such a case. The invention can be also applied to a fluid machine of another type or a rotating electric machine such as a motor or the like.

According to the invention as mentioned above, since the run-out component is eliminated from the displacement sensor signal of the magnetic bearing, the load of the power amplifier to drive the electromagnet is reduced, there is a surplus for the saturation which is caused in a high frequency band, and the reliability of the control system can be improved. A positional accuracy which was deteriorated due to the run-out can be improved.

What is claimed is:

1. A magnetic bearing control apparatus for controlling a magnetic bearing assembly including a magnetic bearing with a rotor and electromagnets for rotatably supporting the rotor by magnetic force, said control apparatus comprising:

a magnetic bearing controller including displacement detecting means for detecting the displacement of the rotor from a predetermined position and providing a displacement signal indicative of the detected displacement; a compensating circuit for determining magnitudes of currents to be applied to the electromagnets of the magnetic bearing so as to hold the rotor at the predetermined position, on the basis of the displacement signal; and current amplifiers for controlling the currents of the electromagnets on the basis of an output signal of said compensating circuit;

a simulating circuit for estimating the position of the rotor from an output signal of said compensating circuit;

a first subtracter for subtracting the output signal of said simulating circuit from the displacement signal; and a second subtracter for subtracting the output signal of said first subtracter from the displacement signal, wherein the output signal of said second subtracter is inputted to said compensating circuit and is inputted to the first subtracter as a further displacement signal to be subtracted.

2. An apparatus according to claim 1, further comprising a feedback circuit between the output of the first subtracter and the input of the second subtracter, for compensation of run-out.

3. An apparatus according to claim 2, wherein:

said feedback circuit comprises a high pass filter and a delay circuit for delaying the input signal by a time of only a period of a fraction of an integer of a rotating period of the rotor, the output signal of said first subtracter is negative-fed back to said delay circuit through said high pass filter, and the output signal of said delay circuit is positive fed back to the output signal of said first subtracter.

4. An apparatus according to claim 2, wherein:

said feedback circuit comprises a high pass filter and a delay circuit for delaying the input signal by a time of only a fraction of an integer of the rotating period of the rotor, the output signal of said first subtracter is positive-fed back through said delay circuit, and the input signal of said delay circuit is negative-fed back to the input side of said delay circuit through said high pass filter.

5. An apparatus according to claim 3, wherein the delay time of said delay circuit is equalized to the rotating period of the rotor.

6. An apparatus according to claim 3, wherein said feedback circuit comprises a rotational speed sync component extracting filter for limiting such that a subtraction signal which is inputted to said second subtracter substantially becomes only a rotational speed synch component.

7. An apparatus according to claim 2, wherein the position of the rotor which was estimated by said simulating circuit and the output of said displacement detecting means are compared by said first subtracter and the comparison result is fed back to said simulating circuit.

8. A magnetic bearing control apparatus for controlling a magnetic bearing assembly including a magnetic bearing with a rotor and electromagnets for rotatably supporting the rotor by magnetic force, said control apparatus comprising:

a magnetic bearing controller including displacement detecting means for detecting the displacement of the rotor from a predetermined position and providing a displacement signal indicative of the detected displacement; a compensating circuit for determining magnitudes of currents to be applied to the electromagnets of the magnetic bearing so as to hold the rotor at a predetermined position, on the basis of a displacement signal; and current amplifiers for controlling the currents of the electromagnets on the basis of an output signal of said compensating circuit;

a simulating circuit for estimating the position of the rotor from the output signal of said compensating circuit;

first subtracter for subtracting the output signal of said simulating circuit from the displacement signal;

a feedback circuit, for compensation of a run-out, to which the output of said first subtracter is inputted; and a second subtracter for subtracting the output signal of said feedback circuit from the displacement signal, wherein the output signal of said second subtracter is set to an input signal of said compensating circuit and a signal to be subtracted of said first subtracter as a displacement signal, and said feedback circuit includes memory means for storing the output of said delay circuit, and supplying the stored signal to said delay circuit for at least two continuous periods.

9. In a rotating machine including a rotor, a magnetic bearing apparatus having a magnetic bearing for rotatably supporting said rotor by magnetic force, and a stator in which said magnetic bearing and said rotor are enclosed, the improvement wherein said magnetic bearing apparatus comprises:

a magnetic bearing controller including displacement detecting means for detecting the displacement of said rotor from a predetermined position and providing a displacement signal indicative of the detected displacement; a compensating circuit for determining magnitudes of currents to be applied to the electromagnets of said magnetic bearing so as to hold said rotor at the predetermined position, on the basis of the displacement signal; and current amplifiers for controlling the currents of said electromagnets on the basis of the output signal of said compensating circuit;

a simulating circuit for estimating the position of said rotor from the output signal of said compensating circuit;

a first subtracter for subtracting the output signal of said simulating circuit from the displacement signal; and a second subtracter for subtracting the output signal of said first subtracter from the displacement signal, wherein the output signal of said first subtracter is inputted to said compensating circuit and is inputted to the second subtracter as a further displacement signal to be subtracted.

* * * * *